(12) United States Patent
Willett

(10) Patent No.: US 8,375,640 B2
(45) Date of Patent: *Feb. 19, 2013

(54) FLANGE ENGAGING STRIP WITH A CARRIER FOR ENGAGING A FLANGE HAVING A VARYING THICKNESS ALONG A LONGITUDINAL DIMENSION

(75) Inventor: Kevin R. Willett, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,248

(22) Filed: Jul. 1, 2011

(65) Prior Publication Data

US 2012/0060424 A1    Mar. 15, 2012

Related U.S. Application Data

(63) Continuation of application No. 11/370,456, filed on Mar. 8, 2006, now Pat. No. 7,997,030.

(51) Int. Cl.
*E06B 7/16* (2006.01)

(52) U.S. Cl. .................................. 49/490.1; 49/498.1

(58) Field of Classification Search .............. 49/490.1, 49/498.1, 475.1; 428/122; 277/637, 641, 277/642, 645, 651, 921
See application file for complete search history.

(56) References Cited

U.S. PATENT DOCUMENTS

| | | | |
|---|---|---|---|
| 2,554,452 A | 5/1951 | Bright | |
| 2,699,581 A | 1/1955 | Schlegel | |
| 3,167,825 A | 2/1965 | Zoller | |
| 3,825,465 A | 7/1974 | Stock | |
| 4,092,813 A | 6/1978 | Eggert | |
| 4,232,081 A | 11/1980 | Pullan | |
| 4,304,816 A | 12/1981 | Bright et al. | |
| 4,399,644 A | 8/1983 | Bright | |
| 4,531,326 A | 7/1985 | Ballocca et al. | |
| 4,576,773 A | 3/1986 | Azzola et al. | |
| 4,584,150 A | 4/1986 | Ballocca | |
| 4,619,077 A | 10/1986 | Azzola et al. | |
| 4,745,665 A | 5/1988 | Hilsenbeck | |
| 4,749,203 A | 6/1988 | Bright | |
| 4,765,936 A | 8/1988 | Ballocca | |
| 4,861,530 A | 8/1989 | Zaccaria | |
| 4,902,549 A | 2/1990 | Bright et al. | |
| 4,959,081 A | 9/1990 | Mathellier | |
| 5,079,882 A | 1/1992 | Bahout | |
| 5,085,006 A | 2/1992 | Hayashi et al. | |
| 5,226,277 A | 7/1993 | Beckmann et al. | |
| 5,267,739 A | 12/1993 | Vaughan | |
| 5,305,553 A | 4/1994 | Shimizu et al. | |
| 5,423,147 A | 6/1995 | Dupuy | |
| 5,626,383 A | 5/1997 | Lee et al. | |
| 5,651,218 A | 7/1997 | Bright et al. | |

(Continued)

FOREIGN PATENT DOCUMENTS

EP    0317086 A1    5/1989
EP    0437964 A3    7/1991

(Continued)

*Primary Examiner* — Katherine W Mitchell
*Assistant Examiner* — Catherine A Kelly
(74) *Attorney, Agent, or Firm* — Howard and Howard Attorneys PLLC

(57) ABSTRACT

A flange engaging strip is provided for engaging a vehicle flange, wherein the flange has a varying thickness along a longitudinal dimension. The flange engaging strip has a closed end and projecting limbs and can include a carrier having a corresponding base and projecting legs that define a constant combined cross sectional length, wherein the cross sectional length of the closed end varies corresponding to the thickness of the flange along a longitudinal dimension of the flange engaging strip.

24 Claims, 13 Drawing Sheets

U.S. PATENT DOCUMENTS

| | | |
|---|---|---|
| 6,024,906 A | 2/2000 | Cook |
| 6,079,160 A | 6/2000 | Bonds |
| 6,247,271 B1 | 6/2001 | Fioritto et al. |
| 6,406,785 B1 | 6/2002 | Janes et al. |
| 6,447,928 B2 | 9/2002 | Suitts |
| 6,461,713 B2 | 10/2002 | King |
| 6,514,604 B2 | 2/2003 | Gopalan et al. |
| 6,532,787 B2 | 3/2003 | Suitts |
| 6,548,143 B1 | 4/2003 | Heller |
| 6,755,638 B2 | 6/2004 | Chen et al. |
| 6,889,472 B2 | 5/2005 | Nozaki et al. |
| 6,926,944 B2 | 8/2005 | Watanabe |
| 6,935,072 B2 | 8/2005 | Kogiso et al. |
| 7,997,030 B2 | 8/2011 | Willett |
| 2003/0051411 A1 | 3/2003 | Nozaki et al. |
| 2005/0246963 A1 | 11/2005 | Kogiso et al. |
| 2006/0005471 A1 | 1/2006 | Yamada et al. |
| 2006/0162257 A1 | 7/2006 | Nozaki et al. |
| 2007/0024084 A1 | 2/2007 | Oba et al. |
| 2007/0113482 A1 | 5/2007 | Dumke et al. |
| 2007/0209313 A1 | 9/2007 | Willett |

FOREIGN PATENT DOCUMENTS

| | | |
|---|---|---|
| EP | 1277608 A1 | 1/2003 |
| EP | 1277608 B1 | 4/2010 |

FLANGE ENGAGING STRIP WITH A CARRIER FOR ENGAGING A FLANGE HAVING A VARYING THICKNESS ALONG A LONGITUDINAL DIMENSION

CROSS-REFERENCE TO RELATED APPLICATIONS

The present application is a continuation of U.S. patent application Ser. No. 11/370,456, filed on Mar. 8, 2006, now U.S. Pat. No. 7,997,030, which was concurrently filed with U.S. patent application Ser. No. 11/370,710, filed on Mar. 8, 2006, now abandoned, all of which are hereby expressly incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to trim strips and weatherstrips for vehicles, and more particularly, to a flange engaging strip having at least one limb and a carrier, wherein a cross sectional dimension of the carrier varies corresponding to a thickness of an underlying flange, so as to maintain a substantially constant orientation between the limb and the flange.

2. Description of Related Art

Flange engaging strips are often used in the motor vehicle industry to cover an exposed flange of the vehicle. The flange engaging strips can also be used to locate a sealing surface, such as a bulb or a lip, with respect to the flange and a confronting surface.

Typically, the flange engaging strip includes a U-shape body defining a flange engaging channel, wherein a plurality of gripping fins project into the channel, such that the gripping fins contact the flange and generally resist removal of the strip from the flange.

Vehicles are often manufactured with a varying flange thickness around a given opening, such as a door or trunk. Thus, a given flange engaging strip may have a section engaging a relatively thin flange and a section engaging a relatively thick flange, with the result being that the insertion force for the relatively thick portion of the flange often exceeds the capability of the operator or available tooling (resulting in poor seating of the strip), and along with the relatively thin section of the flange the extraction force between the strip and the flange is often less than required to operably locate, or retain the strip.

In addition, the varying thickness of the flange causes a distortion in the flange engaging strip. Specifically, a change in the thickness of the flange changes the orientation of the flange engaging strip as well as the orientation of the gripping fin relative to the flange, thereby misaligning the flange engaging strip with the flange (and any associated sealing member) as well as altering the insertion and extraction forces relative to the flange. The gripping fin (or fins) are forced into a different orientation in response to a change in the thickness of the flange, and thus distorted from the intended operating configuration, thereby reducing the performance of the flange engaging strip. Conversely, if such optimized gripping fins (and flange engaging strip) are disposed on a flange having less than the designed thickness, contact between the gripping fin and the flange will be reduced or contact will occur along a different portion of the gripping fin than intended.

In U.S. Pat. No. 4,959,081, the problem of varying flange thickness is addressed by folding one of the legs inwardly toward the remaining leg of the channel. However, merely changing the angle of the leg relative to the flange causes the orientation of any associated gripping fins and any sealing member to change relative to the flange. This change of orientation causes the gripping part and sealing member to vary from the intending operating orientation, thereby sacrificing performance. In addition, changing the angle of the leg relative to the flange can induce a rocking or pivoting of the closed end about the terminal edge of the flange.

Therefore, the need exists for a flange engaging strip that can provide a substantially constant insertion and extraction force for different flange thicknesses. A need further exists for a flange engaging strip that can consistently maintain an orientation of a sealing interface substantially independent of an underlying flange thickness. A need also exists for a flange engaging strip that can maintain a designed orientation and contact area between a grip fin and the flange.

BRIEF SUMMARY OF THE INVENTION

The present invention includes a flange engaging strip sized to accommodate different flange thicknesses, thereby allowing the flange engaging strip to provide at least a substantially consistent orientation with respect to different flange thicknesses, as well as providing a substantially constant insertion and extraction force, independent of the corresponding flange thickness.

The flange engaging strip has a generally U-shape cross section including a closed end and a pair of limbs projecting from the closed end, thereby defining a flange engaging channel. The U-shape cross section of the flange engaging channel is sized to receive the corresponding flange thickness, wherein the flange thickness varies along a longitudinal dimension of the flange and the flange engaging channel is sized prior to receiving the flange.

In one configuration, the flange engaging strip includes a carrier, wherein the carrier extends along a longitudinal dimension and has a cross section defined by a pair of legs and an interconnecting base, wherein the legs and the base have a constant combined cross sectional length, and a cross sectional length of the base varies along the longitudinal dimension of the carrier.

In further configurations, it is contemplated the cross sectional length of the base varies corresponding to the thickness of the flange. For example, the cross sectional length of the base and one leg may vary along the longitudinal dimension of the carrier corresponding to the thickness of the flange. Alternatively, the individual cross sectional length of each of the base and the two legs can vary along the longitudinal dimension of the carrier corresponding to the thickness of the flange, while maintaining a constant combined cross sectional length.

In one configuration, the flange engaging strip includes a body substantially encapsulating the carrier, wherein the strip includes limbs and the closed end corresponding to the legs and the base of the carrier. In this configuration, the limbs and the closed end of the body have a constant combined cross sectional length, and a cross sectional length of the closed end varies with the cross sectional length of the base along the longitudinal dimension of the carrier in correspondence with the thickness of the flange.

The body of the flange engaging strip which incorporates the carrier can include at least one grip fin for engaging the flange, wherein the carrier is configured to provide a substantially constant orientation of the grip fin and the flange, independent of the flange thickness.

Similarly, the body of the flange engaging strip which incorporates the carrier can include at least one sealing member, wherein the carrier is configured to provide a substantially constant orientation of the sealing member relative to the flange, independent of the flange thickness.

The flange engaging strip can be engaged with a flange, wherein the flange has a first longitudinal section of a first width and a second longitudinal section of a second width. The flange engaging strip has a first section of a first preformed width to engage the first longitudinal section of the flange and a second section of a different second preformed width, the second width sized to engage the second section of the flange.

BRIEF DESCRIPTION OF THE SEVERAL VIEWS OF THE DRAWING(S)

DETAILED DESCRIPTION OF THE INVENTION

Figure 1:
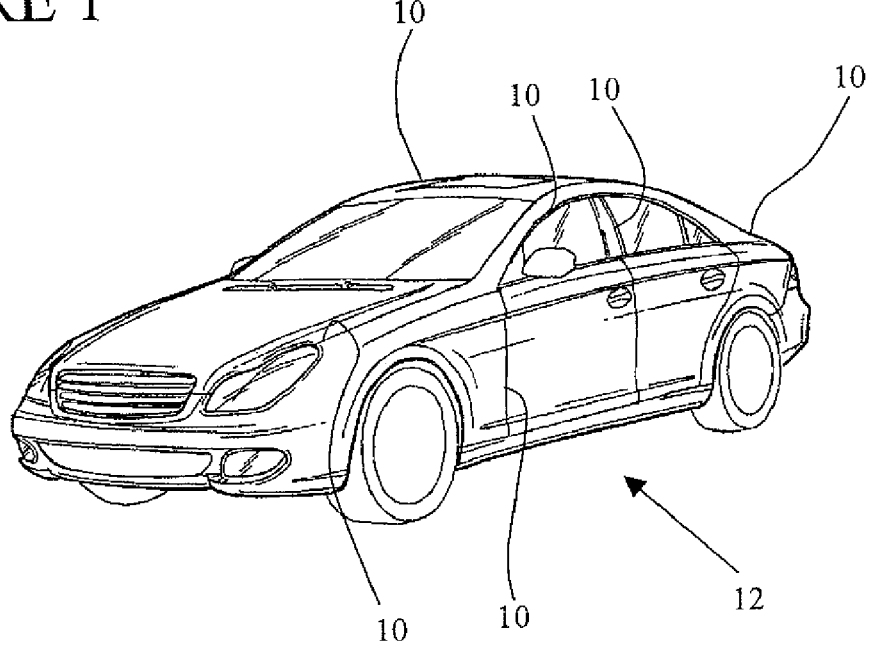
FIG. 1 is a perspective view of a vehicle showing a plurality of locations for the present flange engaging strip.

Referring to FIG. 1, a flange engaging strip 10 can be employed on a vehicle 12 on a variety of flange locations.

The flange engaging strip 10 includes but is not limited to extrusions, moldings, trims, finishing strips, trim pieces, edge pieces, glass guidance components, glass run channels, weatherstrips and seals. In the motor vehicle industry, weatherstrip configurations can be used in many areas including, but not limited to, glass guidance components, glass run channels, door seals, roof rails, deck lids, hood to cowl seals, window seals, sunroof seals as well as inner or outer beltline seals.

Thus, the flange engaging strip 10 can function as a trim (or finishing) strip, a weatherstrip or both. As a trim strip, the flange engaging strip 10 covers an exposed terminal edge of a flange 14. As a weatherstrip, seen in FIGS. 2-7, the flange engaging strip 10 engages as the flange 14 and includes a sealing member 30 to provide a sealing interface with a panel 16. The sealing interface can be static or dynamic. A typical dynamic sealing interface can result from motion of the panel 16, the flange engaging strip 10, or a combination of both.

Figure 2:
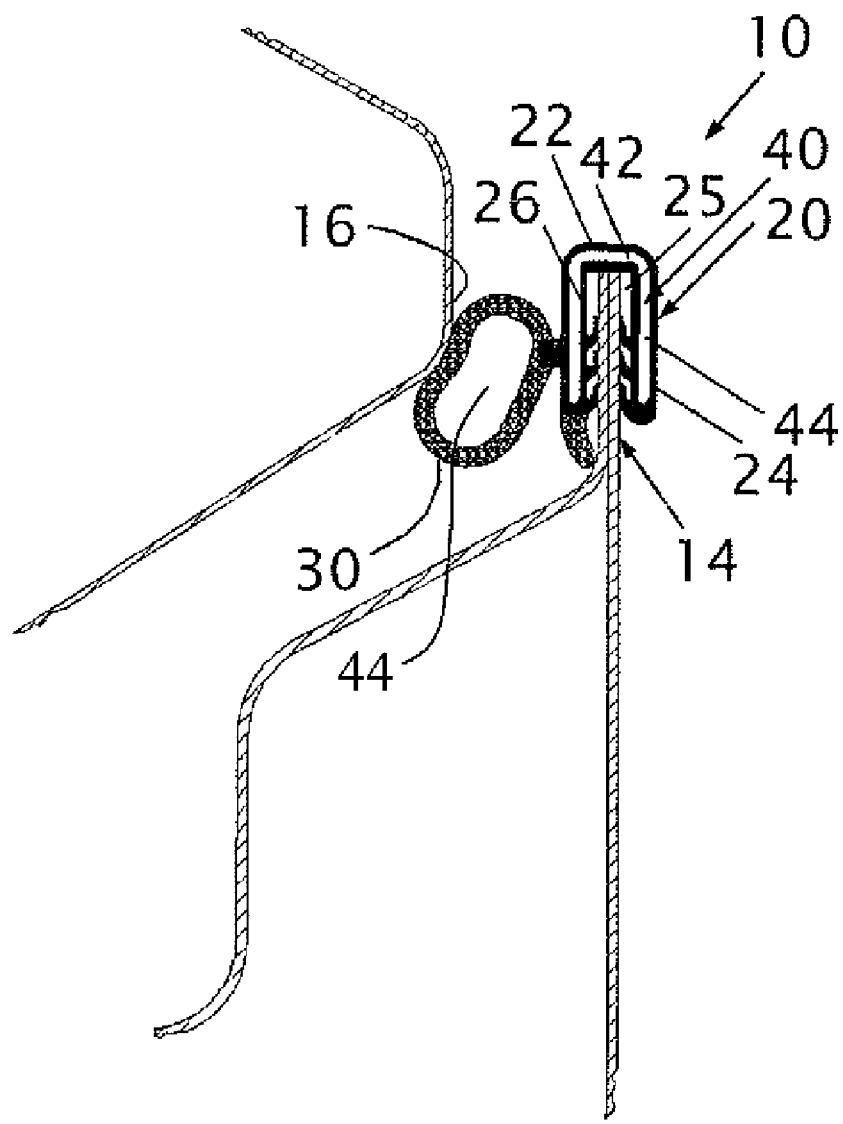
FIG. 2 is a cross sectional view showing operable engagement of a flange engaging strip incorporating the carrier on a first flange thickness.
Figure 3:
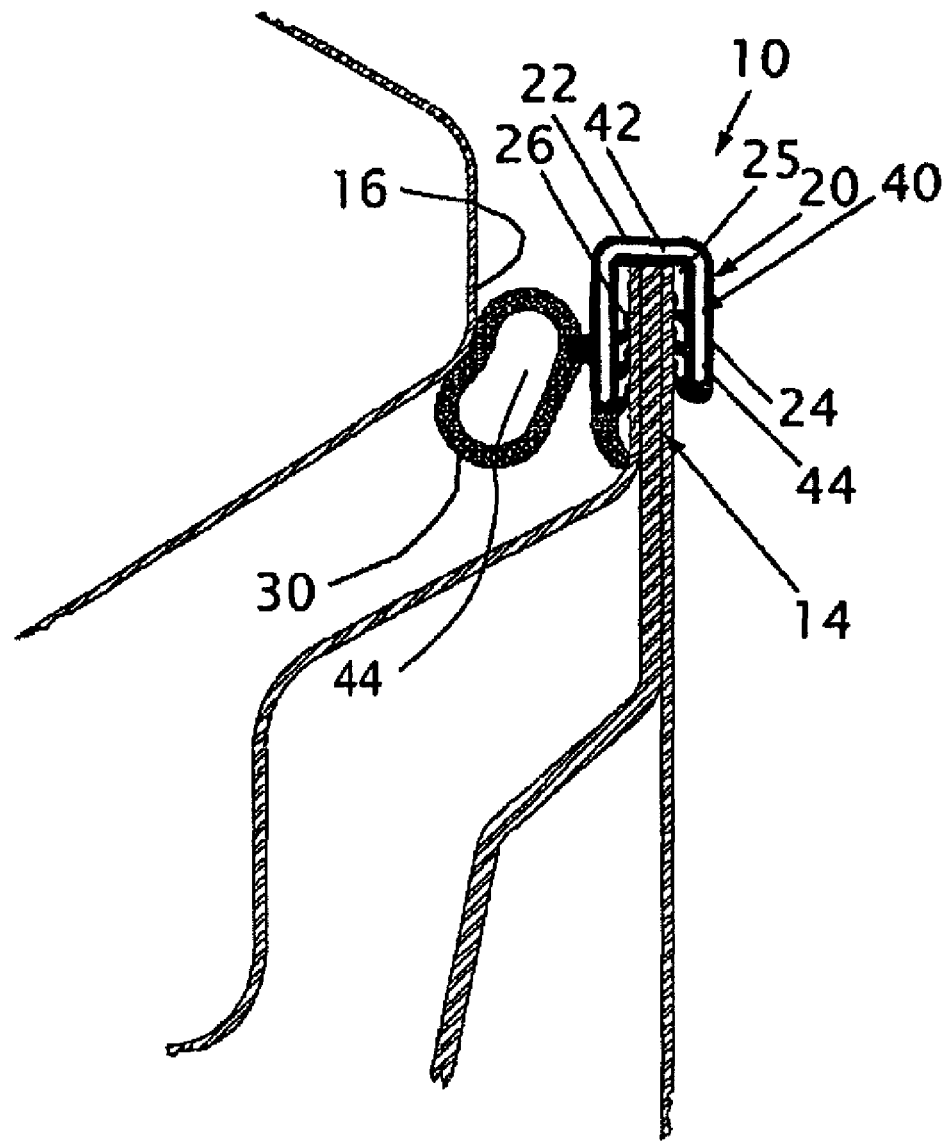
FIG. 3 is a cross sectional view of a flange engaging strip employing the carrier of FIG. 2 on a second greater flange thickness, wherein the limbs of the flange engaging strip are of unequal length and the legs of the carrier are of unequal length.
Figure 4:
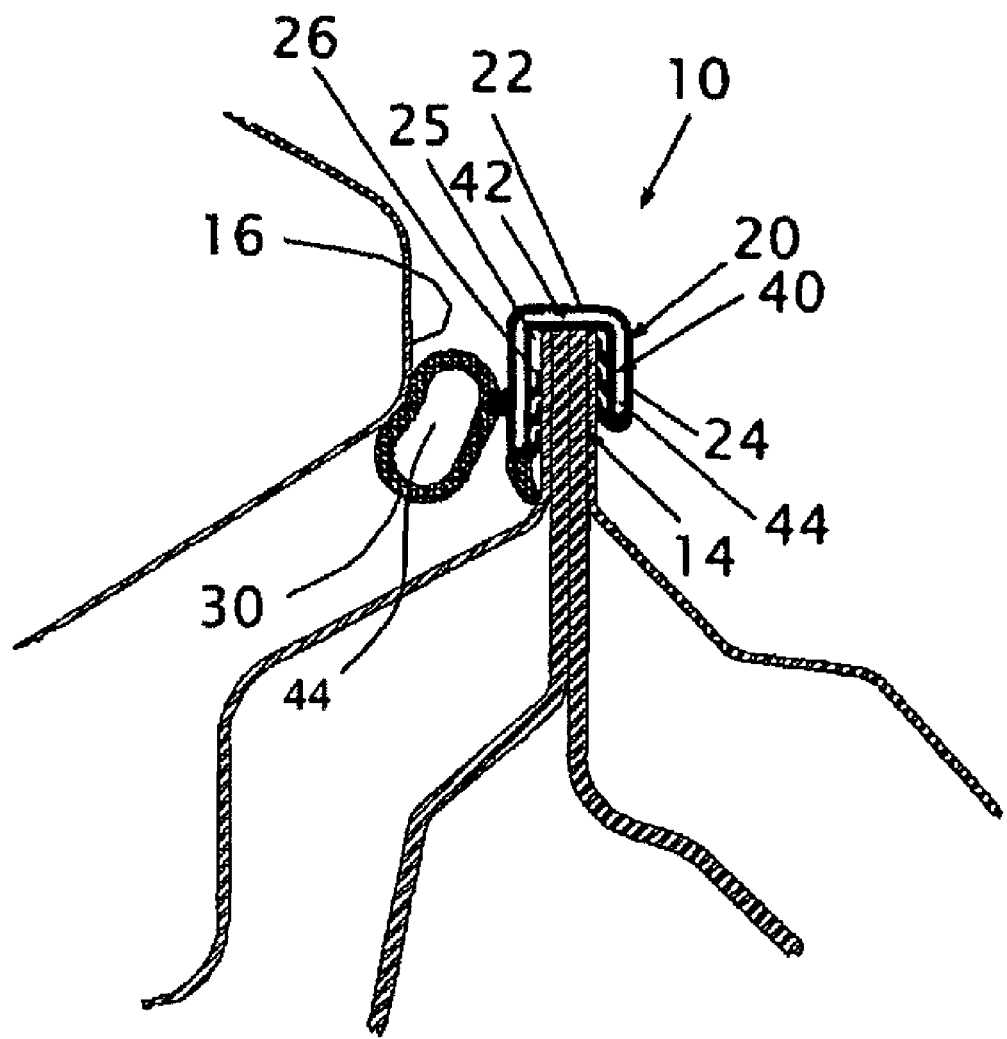
FIG. 4 is a cross sectional view of the flange engaging strip of FIG. 2, operably located on a flange having a thickness approximately three times greater than the flange of FIG. 2, wherein the legs of the carrier are of unequal length.

As seen in FIGS. 2-4, the flange 14 can be formed by the joining of 1, 2, 3 or more sheets (or panels) of material, wherein the sheets typically form a door or a portion of the frame or the body of the vehicle 12. The number of sheets or panels forming a given portion of the flange 14 can vary along a length, or longitudinal dimension of the flange. For example, in some locations two body panels are brought together to form the flange 14 having a two layer thickness. However, different sections of the flange 14 can include the thickness of both the body panels and a portion of the vehicle frame (or a reinforcing member), resulting in the flange having three or more layers. The flange engaging strip 10 is required to cooperatively engage each such section of the flange 14. Thus, a given portion of the flange engaging strip 10 is required to engage a length of the flange 14 defined by a given thickness and a length of flange defined by a different thickness.

As seen in FIGS. 2-5, the flange engaging strip 10 includes a body 20 which incorporates a carrier 40. In one configuration, the flange engaging strip 10 has a generally U-shape cross section including a closed end 22 and a pair of limbs 24 projecting from the closed end, thereby defining a flange engaging channel 25. The U-shape cross section of the flange engaging channel 25 is sized to receive the flange 14.

As described herein, the flange 14 and the flange engaging strip 10, including the carrier 40, extend along a longitudinal dimension, and thus have a length extending in the longitudinal dimension. In the description of the cross section of the flange engaging strip 10, the term cross sectional length is used to designate the distance or dimension across the cross section (transverse to the longitudinal dimension). For example, the carrier 40 can have a tip to tip cross sectional length of approximately 1.5 inches, yet extend about a vehicle opening having a perimeter of approximately 9 feet, and thus have a length in the longitudinal dimension of approximately 9 feet.

The flange engaging strip 10 can include at least one grip fin 26 projecting from one limb 24 and extending into the flange engaging channel 25 to contact the flange 14. The grip fin 26 can assist in retention of the flange engaging strip 10 on the flange 14 as well as orientation of the flange engaging strip on the flange. Although the terms grip fin and grip fins are variously used in the description, the flange engaging strip 10 is not limited to any particular configuration having a single grip fin or a plurality of grip fins. The recitation in the description of a single grip fin does not exclude more than one grip fin, and recitation of a plurality of grip fins does not preclude a single grip fin.

The grip fin 26 can be configured to have an optimal or designed orientation and contact area for engagement with the flange 14. Depending upon desired performance characteristics of the flange engaging strip 10, the strip typically includes a plurality of grip fins 26 having a predetermined cross section, or predetermined area designed to contact the flange 14. In addition, the grip fins 26 can be formed of a material different from the remainder of the body 20. It is also contemplated that the grip fin 26 can have portions formed of different materials, such as different coefficients of friction, rigidity or compression resistance, so as to optimize performance of the grip fin, and hence the flange engaging strip 10. These optimized parameters of the grip fin 26 require the grip fin be disposed in a predetermined or given orientation with respect to the flange 14.

Figure 5:
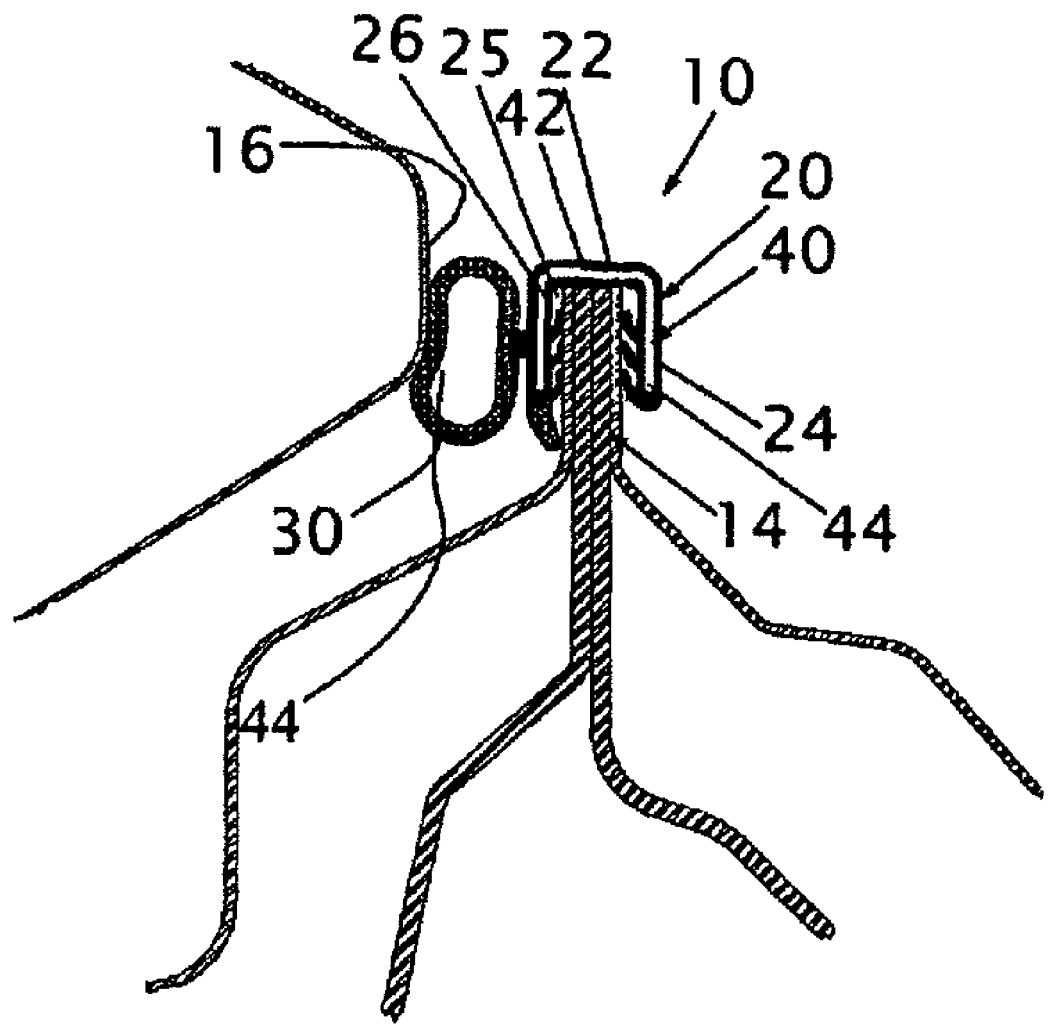
FIG. 5 is a cross sectional view of the flange engaging channel of FIG. 4, wherein the legs of the carrier have an equal length.
Figure 6:
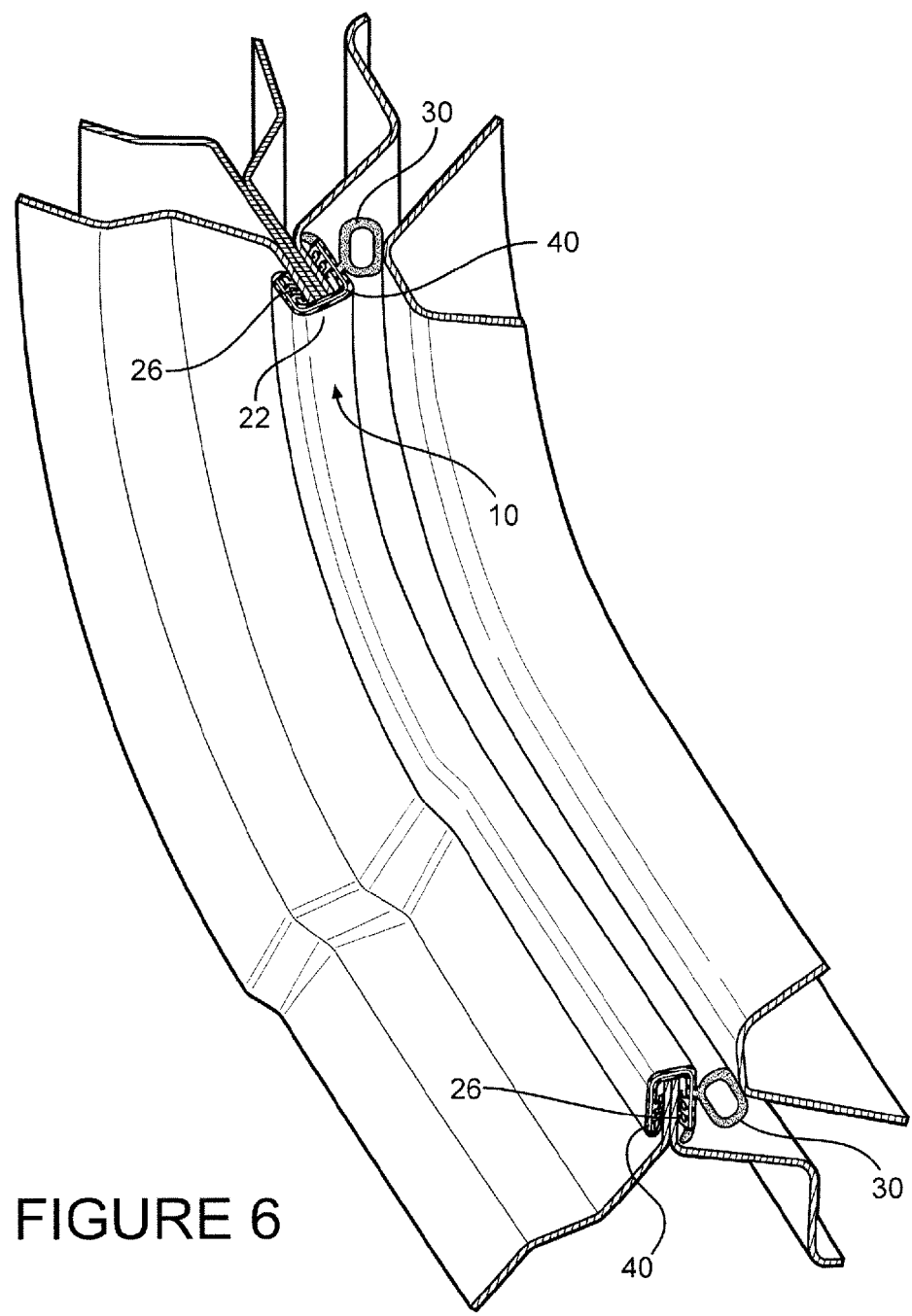
FIG. 6 is a perspective view showing a continuous length of the flange engaging strip operably engaged with a section of flange having a first thickness and a second section of flange having a different second thickness.
Figure 7:
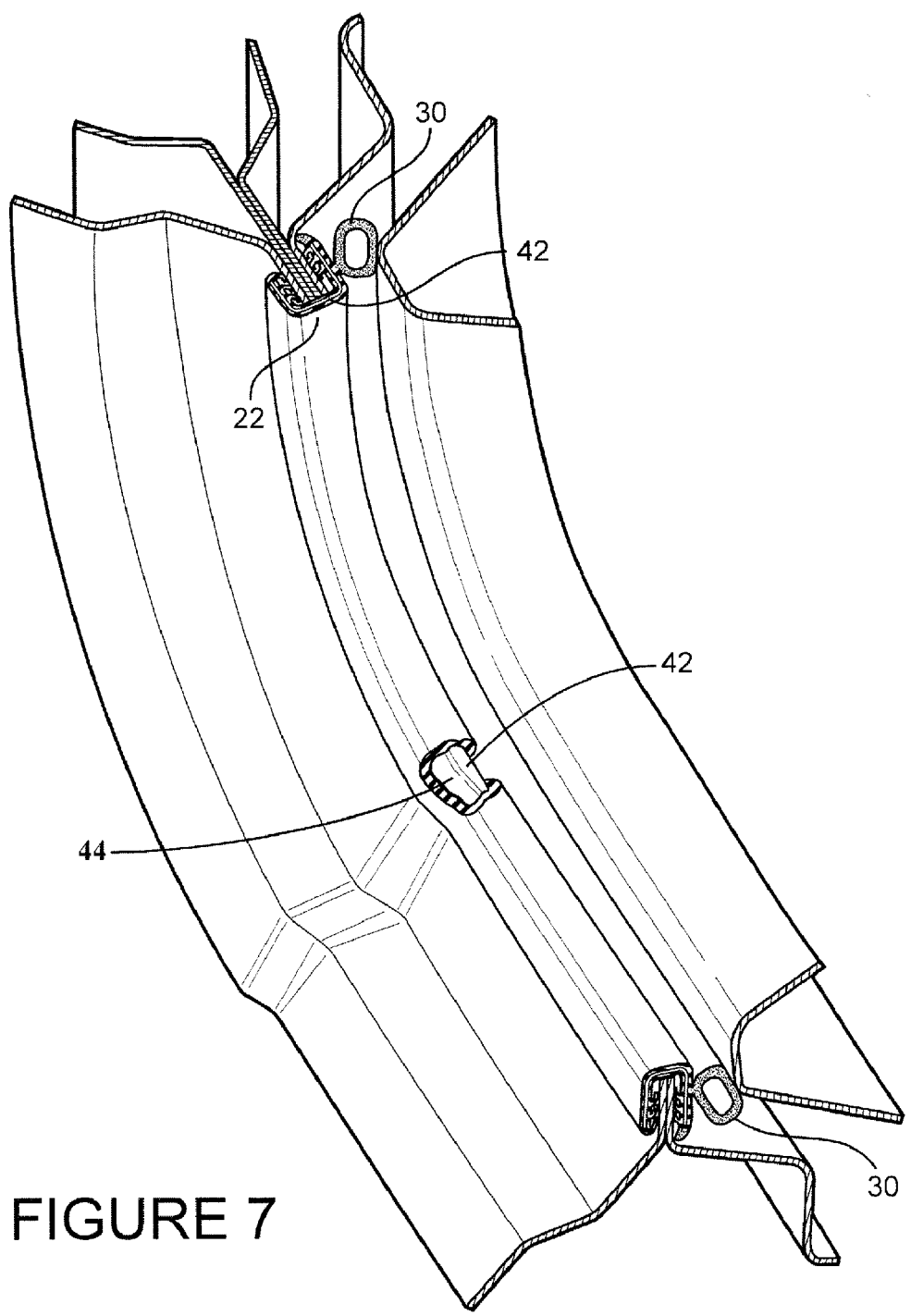
FIG. 7 is a partial cut away perspective view showing cross sections of the flange engaging strip operably engaged with a section of flange having a first thickness and a second section of flange having a different second thickness.

In selected configurations, the flange engaging strip 10 includes the sealing member 30 to provide a sealed interface. The sealing member 30 can be connected to, or extend from the flange engaging strip 10. The sealing member 30 can have any of a variety of configurations such as bulb, flap, finger or fin. Referring to FIGS. 5 and 6, the sealing member 30 is typically designed to provide a seal line or interface with a confronting surface of the vehicle 12 along a longitudinal dimension of the flange engaging strip 10.

Typically, the body 20 is a polymeric material which encapsulates the carrier 40. The body 20 can be formed of any of a variety of materials including thermoplastic or thermosetting materials, including, but not limited to thermoplastic elastomers (TPE), EPDM, or any combination thereof. Satisfactory thermoplastic and TPE materials include PERMA-PRENE™ by Metzeler Automotive Profile Systems, Sarlink® by DSM Thermoplastic Elastomers, Inc. of Massachusetts, Santoprene® by Advanced Elastomer Systems of Ohio and Uniprene® by Teknor Apex Company of Rhode Island. Suitable vulcanized or cross linked (thermosetting) polymeric materials include EPDM, EPDM modified with chloro butyl, and EPDM-SBR blends.

The grip fins 26 and the sealing member 30 can be formed of the same or different material than the body 20.

The carrier 40 provides a structural rigidity to the flange engaging strip 10 and provides a clamping force or bias against the flange 14. In one configuration, the carrier 40 follows the U-shape of the flange engaging channel 25, and has a base 42 corresponding to the closed end 22, wherein the base interconnects a pair of projecting legs 44 which correspond to the limbs 24 of the body 20.

Figure 8:
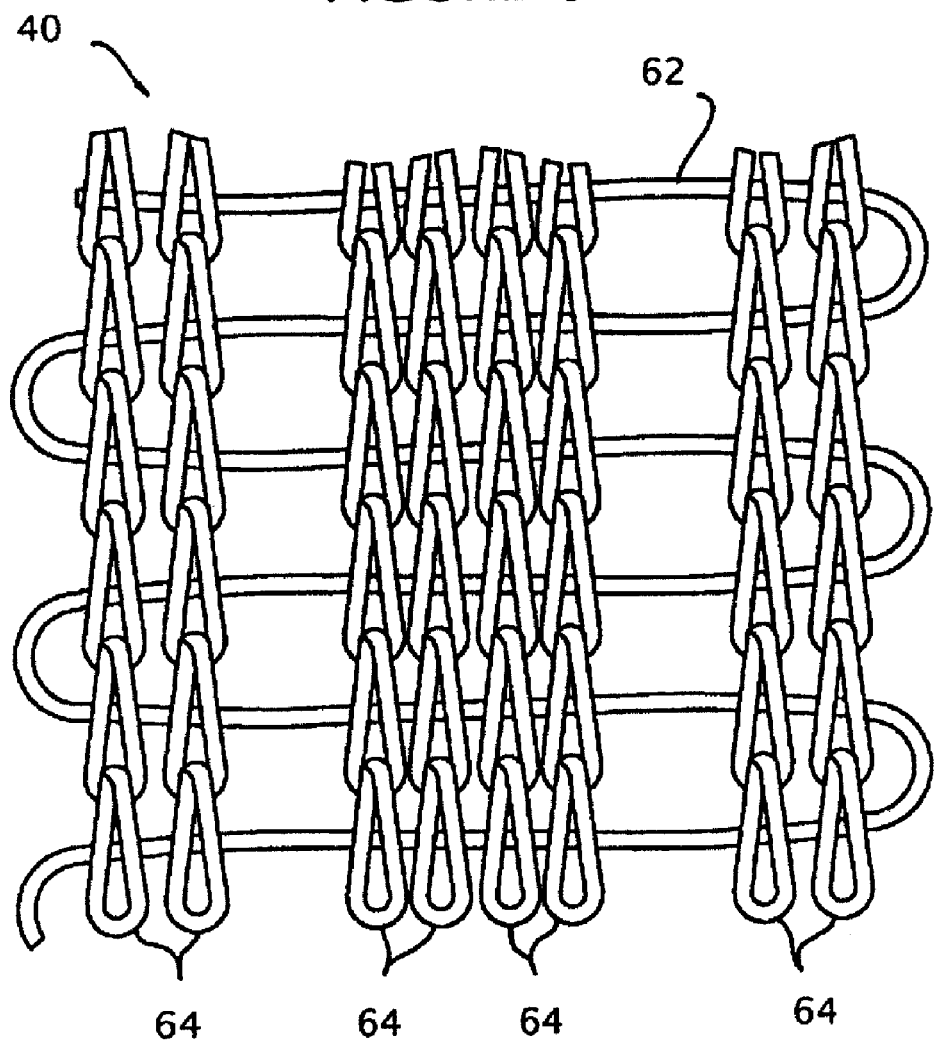
FIG. 8 is a perspective view of a representative carrier of the wire type in a flat configuration.
Figure 9:
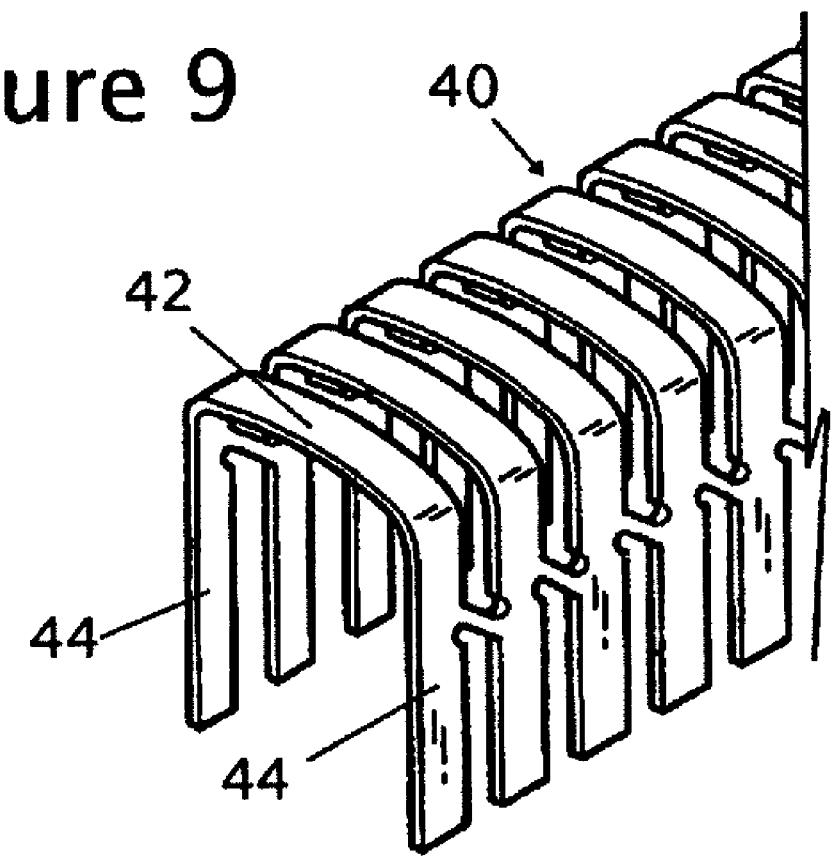
FIG. 9 is a perspective view of a representative carrier of the lanced and stretched type in a post formed configuration.

The carrier 40 can be a wire or metal carrier of known construction such as knitted wire, slotted, rolled, formed or stamped metal. As seen in FIG. 8, a representative knitted wire carrier having a serpentine frame 62 and warps 64 is shown, and in FIG. 9, a representative lanced and stretched carrier is shown.

Referring to FIGS. 5 and 6, the flange engaging strip 10 (and the carrier 40) extend along a longitudinal dimension, wherein the thickness of the flange 14 varies along the longitudinal dimension. As set forth herein, the carrier 40, and hence flange engaging strip 10 are constructed to accommodate predetermined changes in the thickness of the flange 14 along the longitudinal dimension.

As readily seen in FIGS. 2-5, the legs 44 and the base 42 of the carrier 40 define a constant cross sectional length along the longitudinal dimension of the carrier 40. That is, for any given cross section of the carrier 40, the combined length of the legs 44 and the base 42 is constant. Similarly, for the flange engaging strip 10, the limbs 24 and the closed end 22 of the strip can define a constant cross sectional length along the longitudinal dimension of the strip. That is, for any given cross section of the flange engaging strip 10, the combined length of the limbs 24 and the closed end 22 is constant. While it is recognized the cross sectional dimension of the closed end 22 and limbs 24 of the flange engaging strip 10 can vary independently of the base 42 and legs 44 of the carrier 40 (such as by forming the body 20 by a variable extrusion), for purposes of the present description, the combined length of the limbs 24 and the closed end 22 is constant.

Further, while the modifications to the cross sectional dimensions are set forth in terms of changes to the base 42 and legs 44 of the carrier 40, it is understood corresponding changes are imparted to the closed end 22 and limbs 24 of the flange engaging strip 10. Thus, the flange engaging strip 10 can reflect corresponding modifications to the cross sectional dimensions as are set forth for the carrier 40.

As seen in FIGS. 2-5, the cross sectional length of the base 42 varies relative to the cross sectional length of the legs 44. In one construction, the cross sectional length of the base 42 corresponds to the thickness of the flange 14. That is, as the thickness of the flange 14 increases, the cross sectional length of the base 42 correspondingly increases. Conversely, when the thickness of the flange 14 decreases, the cross sectional length of the base 42 correspondingly decreases. In this construction, the orientation of the at least one of the grip fin 26 and the sealing member 30 remains substantially constant with respect to the flange 14. That is, the orientation of the limb 24 from which the grip fin 26 or sealing member 30 projects remains constant, independent of the thickness of the flange 14, thereby allowing the grip fin and/or sealing member to have a constant orientation relative to the flange.

It is understood as the effective length of the leg 44 is shortened, the location of the grip fin 26 or the sealing member 30 relative to the flange 14 may change. That is, if the leg 44 is shortened, the sealing member 30 may be correspondingly moved relative to a terminal edge of the flange 14, yet the orientation of the sealing member relative to the flange remains constant.

By varying the cross sectional length of the base 42 corresponding to the width (thickness) of the underlying flange 14, the grip fins 26 can be designed and constructed for a given orientation and engagement pressure range with the flange which remains constant independent of the thickness of the flange, thereby optimizing performance. That is, the grip fins 26 are compressed by a substantially constant amount, independent of the thickness of the flange 14. Further, the uniform orientation of the sealing member 30 with respect to the flange 14 allows for increased sealing performance.

The effective cross sectional length of the base 42 can be reduced by correspondingly increasing the cross sectional length of one of the legs 44. Alternatively, an inflection point, pleat, fold or "kink" can be formed in the base 42, thereby shortening the effective cross sectional length of the base, without changing the length of either of the legs 44.

Thus, one configuration provides the legs 44 (and hence limbs 24) remain in an essentially constant orientation with respect to each other (such as parallel or inclined) independent of the thickness of the flange 14. That is, for a relatively thick flange 14, the legs 44 can be parallel, and by changing the cross sectional length of the base 42, the legs can be parallel upon engaging a thinner flange. Similarly, if the legs 44 are inclined for a thin flange 14, the legs can remain in the same inclined orientation for a thicker flange. Thus, the base 42 and legs 44 can have a constant orientation substantially independent of the thickness of the flange 14.

It is further contemplated that the absolute position of the grip fin 26 or the sealing member 30 relative to the flange 14 can be maintained when the cross sectional length of the base 42 changes by changing the location of the grip fin or sealing member along the cross sectional length of the leg 44. That is, if the change in the cross sectional length of the base 42 results in the sealing member 30 being ⅛ inch further spaced from the closed end of the flange engaging strip 10, then the position of the sealing member along the leg 44 can be correspondingly adjusted to maintain the position of the sealing member relative to the flange 14. Thus, the location of the grip fin 26 or the sealing member 30 along the cross sectional length of the carrier 40 can change corresponding to the width of the flange 14, while maintaining a constant orientation of the grip fin or the sealing member relative to the flange.

The flange engaging strip 10 is formed, during the manufacturing process to have the cross section shown, for example, in FIG. 4, for those sections where the flange 14 is relatively thick and to have the cross section shown, for example, in FIG. 2, for those sections where the flange is relatively thin. As the cross sectional length of the base 42 increases (for a thicker flange 14), the cross sectional length of one of the legs 44 can decrease. Conversely, as the cross sectional length of the base 42 decreases (for a thinner flange 14) the cross sectional length of at least one of the legs 44 can increase.

Generally, the desired cross sectional profile of the flange engaging strip 10 (and the carrier 40) is obtained by passing the formed strip through a post forming apparatus which can be programmed in accordance with the known, or predetermined, thickness profile of the flange 14 around the vehicle opening (or along the longitudinal dimension), so that the different configurations of the carrier 40 (and hence the flange engaging strip) are properly located along the longitudinal dimension of the strip. Thus, the cross sectional dimension of the base 42 (and closed end 22 of the flange engaging strip 10) vary along the length of the flange engaging strip 10 in a manner which is predetermined and corresponds to the predetermined variation of the thickness of the flange 14.

Figure 10:
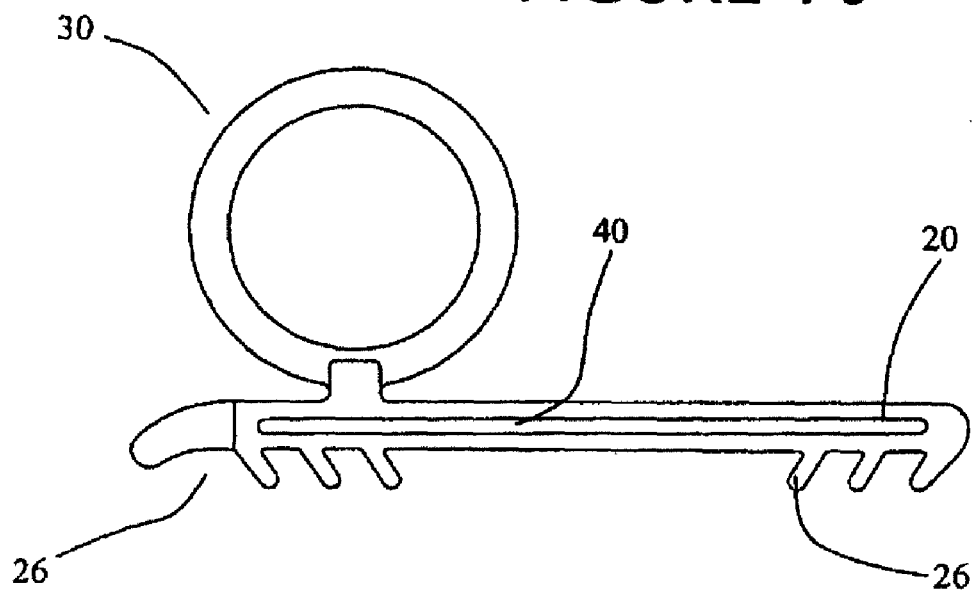
FIG. 10 is a cross sectional view of the flange engaging strip in a flat configuration, prior to post forming.
Figure 11:
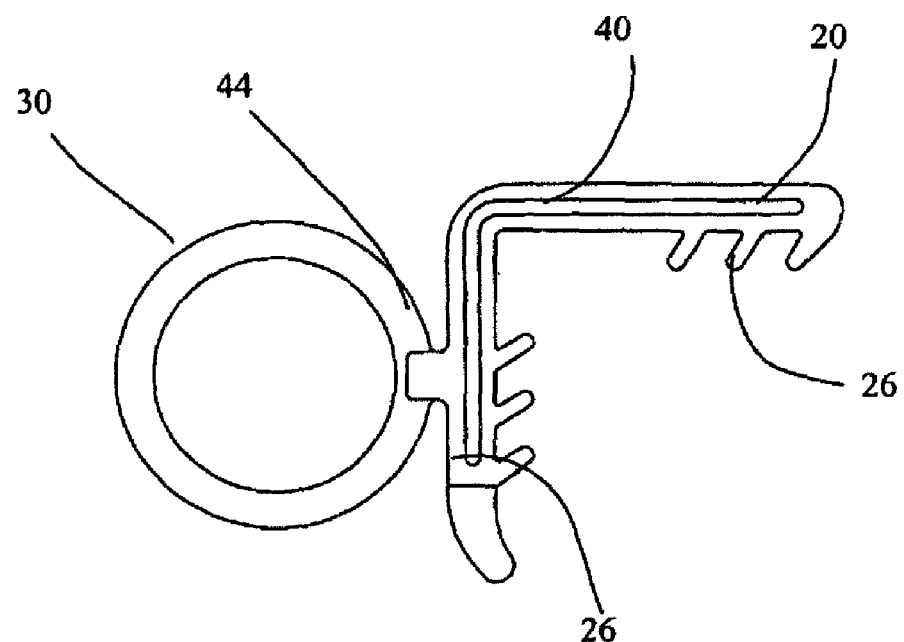
FIG. 11 is a cross sectional view of the flange engaging strip in a one bend configuration, prior to post forming.
Figure 12:
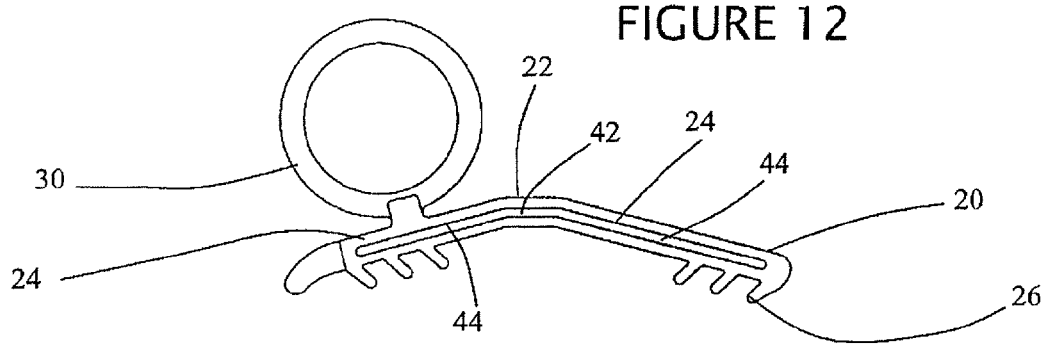
FIG. 12 is a cross sectional view of the flange engaging strip in a first post forming stage.
Figure 13:
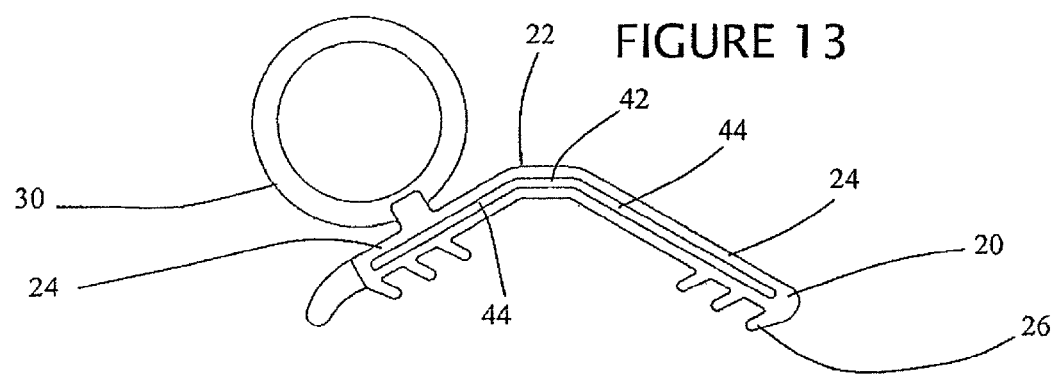
FIG. 13 is a cross sectional view of the flange engaging strip in a second post forming stage.
Figure 14:
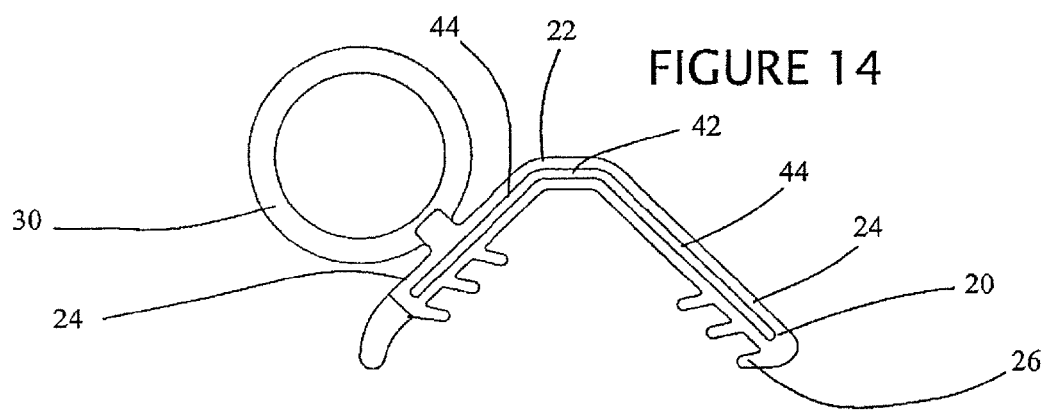
FIG. 14 is a cross sectional view of the flange engaging strip in a third post forming stage.
Figure 15:
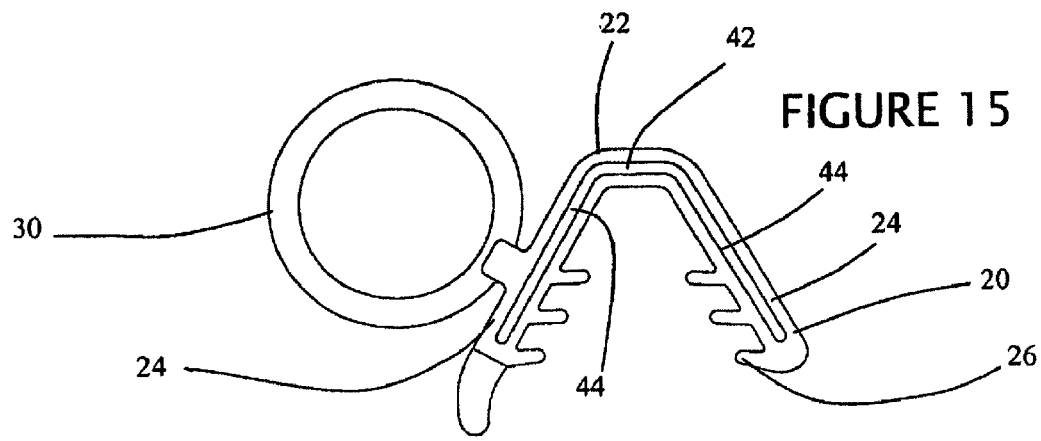
FIG. 15 is a cross sectional view of the flange engaging strip in a fourth post forming stage.
Figure 16:
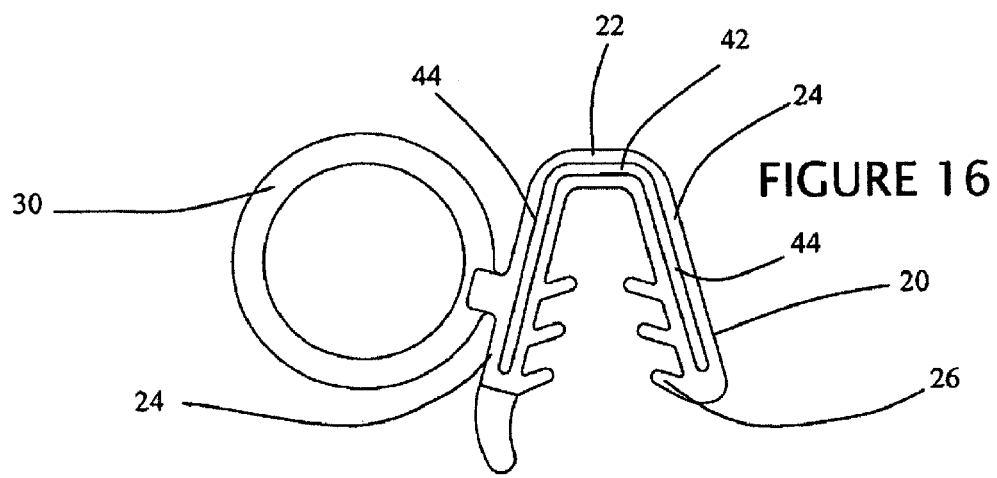
FIG. 16 is a cross sectional view of the flange engaging strip in a fifth post forming stage.
Figure 17:
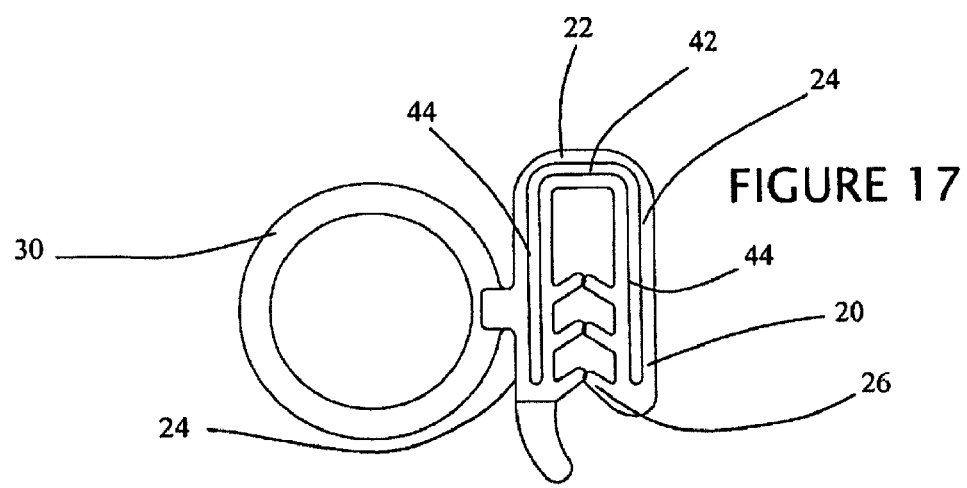
FIG. 17 is a cross sectional view of the flange engaging strip in a sixth post forming stage.

In one method of construction, the carrier 40 is fed through a standard and known extrusion die which embeds the carrier within the body 20. The carrier 40 is fed through the extrusion die in either a flat (open) configuration as seen in FIG. 10, or a relatively open configuration, such as a single bend configuration as seen in FIG. 11.

As the carrier 40 is fed through the extrusion die in either the flat or single bend configuration, any associated grip fins 26 and sealing member 30 can be readily formed. That is, if multiple grip fins 26 are formed, the grip fins can be extruded in a non interfering orientation, and the carrier 40 (the flange engaging strip 10) can be post formed to dispose the grip fins in an interfering position.

Figure 18:
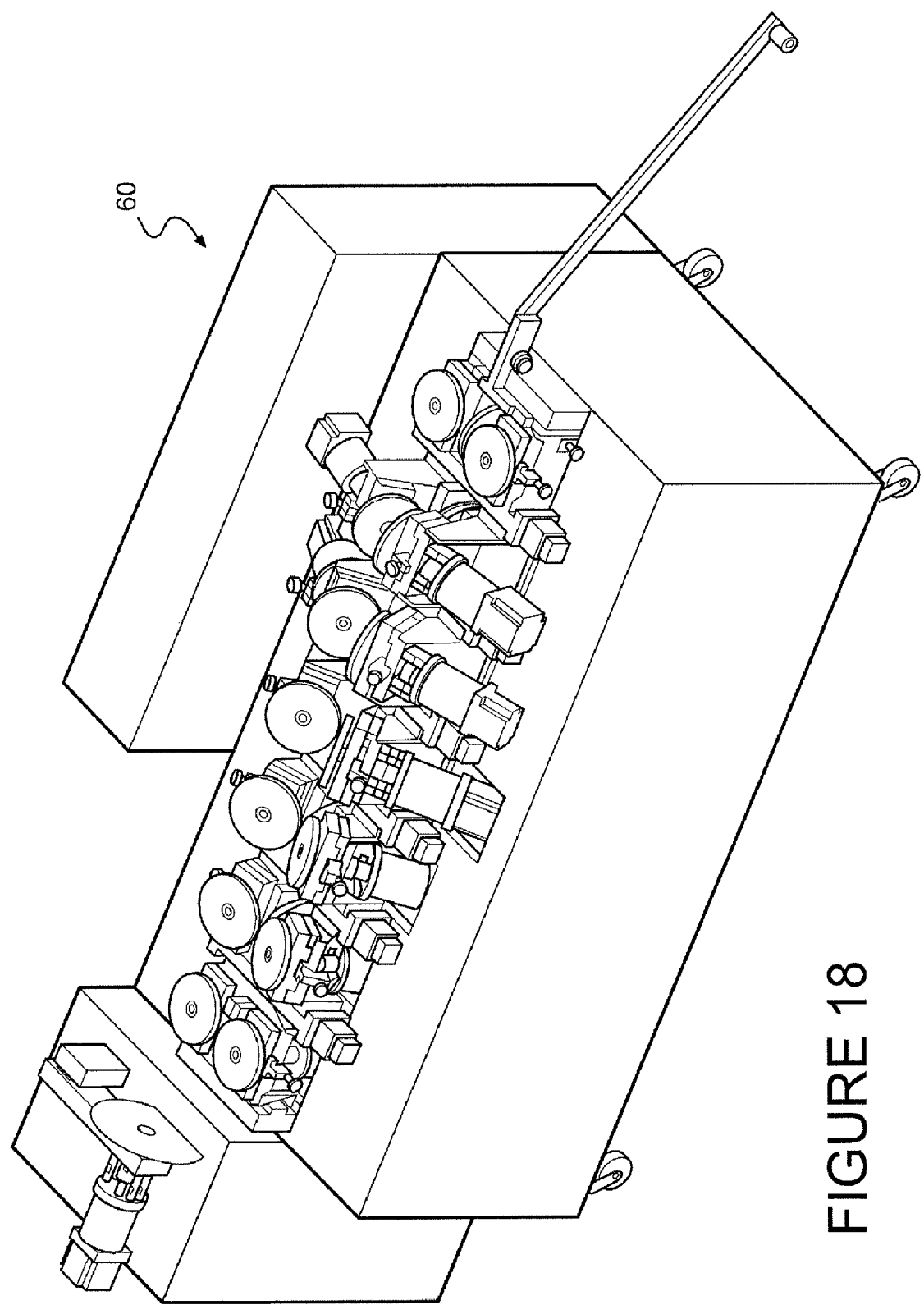
FIG. 18 is a perspective view of a roll forming apparatus for post forming the flange engaging strip.

Subsequent to forming the polymeric body 20 about the carrier 40 (and curing of the polymeric material, if necessary), the flange engaging strip 10 (including the carrier) are folded, or bent to define the cross sectional length of the legs 44 and the interconnecting base 42, wherein the cross sectional length of the base varies along a longitudinal dimension and corresponds to the predetermined thickness of the flange 14. The bending of the flange engaging strip 10 can be accomplished by a roll forming apparatus as shown in FIG. 18. Generally, the roll forming apparatus includes a pair of rollers which can be selectively moved transverse to the longitudinal dimension of the flange engaging strip 10, to control the cross sectional length of the base 42.

In those constructions of the flange engaging strip 10 where the carrier 40 is embedded in a flat configuration, a first bend line is formed to define a cross sectional length of one of the legs 44 and an end of the base 42, and a second bend line is formed defining the cross sectional length of the base and the cross sectional length of the remaining leg. It is understood the bend lines can be simultaneously or sequentially imparted to the carrier 40. A representative apparatus 60 for imparting the bends to the carrier 40, and hence flange engaging strip 10 is shown in FIG. 18. The apparatus is fully set forth in U.S. patent application Ser. No. 11/370,710, now abandoned, entitled POST-FORMING APPARATUS FOR CONTINUOUSLY SHAPING AN EXTRUDATE, and hereby expressly incorporated by reference.

Referring to FIGS. 12-17, a series of stages are shown in the post forming of the flat configuration to an operable, flange engaging configuration.

In those configurations of the flange engaging strip 10, where the carrier 40 is embedded in a single bend configuration, the cross sectional length of one of the legs 44 is initially set by the location of the single bend. In the post forming process a second bend is formed in the carrier 40 to define the cross sectional length of the base 42 and the cross sectional length of the remaining leg 44.

It is understood that a variable extrusion die can be employed with a carrier 40 that is preformed to the desired cross section, wherein the variance of the die corresponds to the varied cross sectional dimension of the base 42 (and closed end 22) along the length of the flange engaging strip 10 in a manner which is predetermined and corresponds to the predetermined variation of the thickness of the flange 14. The variable extrusion die provides for the position of the grip fin 26 or the sealing member 30 to be adjusted relative to the base 42 to provide a constant position relative to the flange 14. That is, the changing of the cross sectional length of the base 42 provides for the constant orientation of the grip fin 26 and the sealing member 30 relative to the flange 14, and correspondingly varying the position of the grip fin and/or sealing member along the cross sectional length of the leg provides for maintaining the position of the grip fin and/or sealing member relative to the flange 14.

The variable extrusion extruder can be any of a variety of devices known in the art, such as but not limited to those shown and described in U.S. Pat. Nos. 4,531,326; 4,576,773; 4,584,150; 4,619,077; 4,765,936 and 4,861,530, each of which is hereby expressly incorporated by reference.

The grip fin 26 of the present flange engaging strip 10 can be designed to provide certain performance characteristics for a given orientation of the grip fin and the flange 14. In contrast to prior constructions in which the orientation of the grip fin 26 relative to the flange 14 varies depending upon (or in response to) the thickness of the flange, the present flange engaging strip 10 provides a constant orientation of the legs 44 and hence limbs 24 and compression of the grip fin relative to the flange, independent of the thickness of the flange. Thus, intended performance characteristics, including the operable compression of the grip fin 26, the insertion force and the extraction force of the flange engaging strip 10 are substantially constant, independent of the thickness of the flange 14.

Similarly, the orientation of the sealing member 30 relative to the flange 14 remains constant, independent of the thickness of the flange. As the present flange engaging strip 10 provides a constant orientation of the body 20 relative to the flange 14, the orientation of the sealing member 30 relative to the flange is constant and independent of the thickness of the flange. By varying the position of the grip fins 26 or the sealing member 30 along the cross sectional length of the carrier 40, the location of the grip fins 26 and the sealing member 30 relative to the flange 14 can also be constant, and independent of the thickness of the flange.

In addition, the present flange engaging strip 10 provides a constant relative orientation of the closed end 22 and the limbs 24 independent of the thickness of the underlying flange 14. Thus, the flange engaging strip 10 can have limbs 24 which are of a given relative orientation, independent of the thickness of the flange, while cooperatively engaging a first flange thickness and a different second flange thickness, and maintaining a constant orientation of the grip fin 26 relative to the flange.

Thus, the flange engaging strip 10 can engage a flange 14, such as a vehicle flange, the flange having a known variable thickness along a longitudinal dimension, the flange engaging strip having a cross section including a closed end 22 and a pair of projecting limbs 24. A method of engaging the flange engaging strip 10 includes installing a first section of the flange engaging strip having a previously formed first dimension of the closed end 22 with a first length of the flange 14 of a first width and installing a contiguous second section of the flange engaging strip having a previously formed different second dimension of the closed end with a second length of the flange of a different second width.

In a further configuration of the method for engaging the flange engaging strip 10 with the flange 14, a reference point or marking, as well known in the art, can be disposed on one or both of the strip and the flange to provide an initial alignment of the strip and the flange. As the reference points are thus aligned, the varying thickness of the flange 14 and the corresponding varying dimension of the closed end 22 (and the base 42) are cooperatively aligned.

While a preferred construction of the invention has been shown and described with particularity, it will be appreciated at various changes and modifications may suggest themselves to one having ordinary skill in the art upon being appraised of the present invention. It is intended to encompass all such changes and modifications as fall within the scope and spirit of the appended claims.

The invention claimed is:

1. A flange engaging strip for operatively gripping a flange having a longitudinal length and a thickness that is variable along the longitudinal length of the flange, said flange engaging strip comprising:
   a body extending along a longitudinal axis for corresponding to the longitudinal length of the flange with said body including a closed end and a pair of limbs extending from said closed end; and
   a carrier disposed in said body and extending along said longitudinal axis with said carrier having a base disposed in said closed end and a pair of legs with one of said legs disposed in one of said limbs and another one of said legs disposed in another one of said limbs for operatively gripping the flange;
   said closed end and said base each presenting a cross-sectional length transverse to said longitudinal axis with said cross-sectional length of both of said closed end and said base correspondingly varying along said longitudinal axis in a predetermined manner for corresponding to the thickness of the flange varying along the longitudinal length of the flange;
   wherein said closed end and said limbs have a constant combined cross-sectional length transverse to said longitudinal axis such that when said cross-sectional length of said closed end decreases, a cross-sectional length of at least one said limbs correspondingly increases and when said cross-sectional length of said closed end increases, the cross-sectional length of at least one said limbs correspondingly decreases, thereby maintaining said constant combined cross-sectional length.

2. The flange engaging strip of claim 1, wherein a relative orientation of said limbs is substantially constant and independent of the thickness of the flange.

3. The flange engaging strip of claim 1, wherein said limbs are substantially parallel independent of the thickness of the flange.

4. The flange engaging strip of claim 1, wherein said cross-sectional length of said closed end and both limbs vary in the predetermined manner for corresponding to the thickness of the flange varying along the longitudinal length of the flange.

5. The flange engaging strip of claim 1, wherein said limbs have a substantially constant relative orientation along said longitudinal axis.

6. The flange engaging strip of claim 1, wherein said body comprises a polymeric material encapsulating said carrier.

7. The flange engaging strip of claim 1, wherein a cross-sectional length of said carrier is defined by said legs and said base, said legs and said base having a constant combined cross-sectional length transverse to said longitudinal axis and said cross-sectional length of said base varying along a longitudinal length of said carrier in the predetermined manner for corresponding to the thickness of the flange varying along the longitudinal length of the flange.

8. The flange engaging strip of claim 7, wherein said cross-sectional length of said base and one leg varies along said longitudinal length of said carrier.

9. The flange engaging strip of claim 7, wherein said cross-sectional length of said base and both legs vary along said longitudinal length of said carrier.

10. The flange engaging strip of claim 7, wherein said legs have a substantially constant relative orientation along said longitudinal length of said carrier.

11. The flange engaging strip of claim 7, wherein a relative orientation of said legs is substantially constant and independent of the thickness of the flange varying along the longitudinal length of the flange.

12. The flange engaging strip of claim 1, further comprising a grip fin projecting from one of said limbs.

13. The flange engaging strip of claim 12, wherein an orientation of said grip fin relative to the flange is independent of the thickness of the flange varying along the longitudinal length of the flange.

14. The flange engaging strip of claim 12, wherein a location of said grip fin relative to the flange is dependent on the thickness of the flange varying along the longitudinal length of the flange.

15. The flange engaging strip of claim 1, further comprising a sealing member connected to one of said limbs and said closed end.

16. The flange engaging strip of claim 15, wherein an orientation of said sealing member relative to the flange is independent of the thickness of the flange varying along the longitudinal length of the flange.

17. The flange engaging strip of claim 15, wherein a location of said sealing member relative to the flange is dependent on the thickness of the flange varying along the longitudinal length of the flange.

18. The flange engaging strip of claim 15, wherein said sealing member has a bulb configuration.

19. The flange engaging strip of claim 15, wherein said sealing member has a flap configuration.

20. The flange engaging strip of claim 1, wherein said closed end of said body has a cross-sectional height remaining constant.

21. The flange engaging strip of claim 20, wherein said closed end of said body includes an inner surface and an outer surface opposing said inner surface with each of said inner and outer surfaces being substantially planar.

22. A vehicle assembly comprising:
   a flange having a longitudinal length and a thickness that is variable along said longitudinal length of said flange;
   a body extending along a longitudinal axis and corresponding to said longitudinal length of said flange with said body including a closed end and a pair of limbs extending from said closed end; and
   a carrier disposed in said body and extending along said longitudinal axis with said carrier having a base disposed in said closed end and a pair of legs with one of said legs disposed in one of said limbs and another one of said legs disposed in another one of said limbs for operatively gripping said flange;
   said closed end and said base each presenting a cross-sectional length transverse to said longitudinal axis with said cross-sectional length of both of said closed end and said base correspondingly varying along said longitudinal axis in a predetermined manner corresponding to said thickness of said flange varying along said longitudinal length of said flange;
   wherein said closed end and said limbs have a constant combined cross-sectional length transverse to said longitudinal axis such that when said cross-sectional length of said closed end decreases, a cross-sectional length of at least one said limbs correspondingly increases and when said cross-sectional length of said closed end increases, the cross-sectional length of at least one said limbs correspondingly decreases, thereby maintaining said constant combined cross-sectional length.

23. The assembly of claim 22, wherein said closed end of said body has a cross-sectional height remaining constant.

24. The assembly of claim 23, wherein said closed end of said body includes an inner surface and an outer surface opposing said inner surface with each of said inner and outer surfaces being substantially planar.

* * * * *